US011852710B2

(12) United States Patent
Maruta et al.

(10) Patent No.: US 11,852,710 B2
(45) Date of Patent: Dec. 26, 2023

(54) FACE-TO-FACE STATE DETERMINATION SYSTEM

(71) Applicants: Where, Inc., Tokyo (JP); Exeo Group, Inc., Tokyo (JP)

(72) Inventors: Hajime Maruta, Tokyo (JP); Nobuyuki Akazawa, Tokyo (JP)

(73) Assignees: Where, Inc., Tokyo (JP); Exeo Group, Inc., Tokyo (JP)

( * ) Notice: Subject to any disclaimer, the term of this patent is extended or adjusted under 35 U.S.C. 154(b) by 419 days.

(21) Appl. No.: 17/271,650

(22) PCT Filed: Aug. 29, 2019

(86) PCT No.: PCT/JP2019/033968
§ 371 (c)(1),
(2) Date: Feb. 26, 2021

(87) PCT Pub. No.: WO2020/045582
PCT Pub. Date: Mar. 5, 2020

(65) Prior Publication Data
US 2021/0341560 A1 Nov. 4, 2021

(30) Foreign Application Priority Data
Aug. 30, 2018 (JP) ................................. 2018-162043

(51) Int. Cl.
*G01S 1/04* (2006.01)
*G01S 5/02* (2010.01)
(Continued)

(52) U.S. Cl.
CPC ............ *G01S 1/045* (2013.01); *G01S 5/0252* (2013.01); *G01S 5/0294* (2013.01); *H04W 4/029* (2018.02)

(58) Field of Classification Search
CPC ...... G01S 1/045; G01S 5/0252; G01S 5/0294; H04W 4/029
(Continued)

(56) References Cited

U.S. PATENT DOCUMENTS 10,756,788 B1 * 8/2020 Jiang .................. H04B 7/15521
2017/0331285 A1 * 11/2017 Delacluyse .............. H04B 1/16

FOREIGN PATENT DOCUMENTS

CN 104661328 B * 2/2018 ............ H04W 84/18
JP 2016/224795 A 12/2016
(Continued)

OTHER PUBLICATIONS

Takao Shime, "Communication Detection System Considering Areas", Symposium of Information Processing Society of Japan, GN Workshop 2008 (online), Nov. 6, 2008, pp. 115-120.
(Continued)

*Primary Examiner* — Harry K Liu
(74) *Attorney, Agent, or Firm* — MARSHALL, GERSTEIN & BORUN LLP

(57) ABSTRACT

Provided is a face-to-face situation determination system in which a first beacon, which is a beacon carried by a first user, transmits a first signal including information identifying the first beacon. A second beacon, which is a beacon carried by a second user, upon receiving the first signal from the first beacon, transmits, toward a control device, a second signal including information identifying the first beacon, a first signal reception intensity, and information identifying the second beacon. The control device receives the second signal and, on the basis of the first signal reception strength included in the second signal, determines that the first user and the second user are facing each other if the first signal reception strength is greater than or equal to a first threshold value for a predetermined period or longer, and determines (Continued)

that the first user and the second user are facing one direction.

2 Claims, 16 Drawing Sheets

(51) Int. Cl.
  *H04W 4/02* (2018.01)
  *H04W 4/029* (2018.01)
(58) Field of Classification Search
  USPC .......................................................... 342/386
  See application file for complete search history.

(56) References Cited

FOREIGN PATENT DOCUMENTS

| WO | WO-2013/035157 A1 | 3/2013 | |
|---|---|---|---|
| WO | WO-2013048454 A1 * | 4/2013 | ............... G01S 5/02 |
| WO | WO-2016/079827 A1 | 5/2016 | |

OTHER PUBLICATIONS

Search Report in International Applicatioin No. PCT/JP2019/033968 dated Oct. 21, 2019, 4 pages.

* cited by examiner

FIG.6

| BEACON NAME | NAME OF ADJACENT BEACON |
|---|---|
| A | B、C、D |
| B | A、D、E |
| C | A、F |
| D | A、B、E、G |
| E | B、D |
| F | C、G |
| G | D、F |

| FACE-TO-FACE STATE | START TIME | END TIME | USERS |
|---|---|---|---|
| FACE-TO-FACE | MAY 20, 10:20:30 | MAY 20, 10:25:00 | A、B |
| ONE DIRECTION | MAY 20, 10:50:50 | MAY 20, 10:55:10 | C、D |
| ... | ... | ... | ... |

T200

FACE-TO-FACE STATE DETERMINATION SYSTEM

TECHNICAL FIELD

The present invention relates to a face-to-face state determination system.

BACKGROUND ART

Aiming at facilitating office communication and improving work efficiency, various types of approaches have been made such as introducing the non-territorial office, setting refreshment spaces, conference rooms, and meeting spaces, and designing desk arrangements and flow lines. Available techniques for measuring the effects of these approaches include questionnaires to employees, measuring the conference room reservation hours, measuring working hours, and keeping track of operation effects (number of project reports, number of proposals, and sales). These techniques enable, to some degree, ascertaining the effects of those approaches.

In addition, beacons (radio beacons) are available that emit electromagnetic waves or the like to notify the receivers of various types of information such as positions. Some beacons send information to mobile terminals. For example, some beacons for mobile terminals use Bluetooth (registered trademark), and a mobile terminal may receive identification information from a plurality of transmitters, whereby the mobile terminal, i.e., receivers, can determine positions thereof.

Furthermore, a technique is known that forms a beacon mesh by a plurality of beacons. The beacons constituting the beacon mesh (also referred to as mesh beacons) have a function of mutually communicating with other beacons installed within the radio coverage range, and form a multi-hop wireless network as a whole. The mesh beacon transmits a radio beacon including identification information thereon to other beacons. The beacon mesh may be connected to another network via a gateway. The gateway can individually send a setting-change command to each beacon in the beacon mesh.

CITATION LIST

Patent Literature

WO 2016/079827

SUMMARY OF INVENTION

Technical Problem

The techniques used to measure the effects of the approaches for facilitating office communication and improving work efficiency, such as questionnaires to employees, measuring the conference room reservation hours, measuring the working hours, and keeping track of operation effects, are indirect measuring techniques and do not implement direct, quantitative measurements.

It is an objective of the present invention to quantitatively measure communication among people.

Solution to Problem

The following means are adopted to solve the above problem.

That is, the first aspect is a face-to-face state determination system including: a plurality of beacons configured to be installed in a predetermined space; a plurality of mobile beacons configured to be carried by users; and a controller configured to control the beacons and the mobile beacons, wherein the beacons and the mobile beacons each perform mesh communication with another beacon or another mobile beacon, a first mobile beacon that is one of the mobile beacons and carried by a first user transmits a first signal including information for identifying the first mobile beacon, a second mobile beacon that is one of the mobile beacons and carried by a second user transmits, upon receiving the first signal from the first mobile beacon, to the controller a second signal including the information for identifying the first mobile beacon, a reception intensity of the first signal, and information for identifying the second mobile beacon, and the controller receives the second signal and performs, based on the reception intensity of the first signal included in the second signal, face-to-face state determination in which the controller determines, when the reception intensity of the first signal is greater than or equal to a first threshold value for a predetermined time period or longer, that the first user and the second user are facing with each other, and determines, when the reception intensity of the first signal is less than the first threshold value and greater than or equal to a second threshold value, which is less than the first threshold value, for the predetermined time period or longer, that the first user and the second user are facing one direction.

According to the first aspect, the face-to-face state determination system determines a face-to-face state of two users carrying mobile beacons, based on the reception intensity of the received signal.

The second aspect is the face-to-face state determination system wherein the second mobile beacon carried by the second user transmits a third signal including the information for identifying the second mobile beacon, a first beacon that is one of the beacons configured to be installed in the predetermined space transmits, upon receiving the first signal from the first mobile beacon carried by the first user, to the controller a fourth signal including the information for identifying the first mobile beacon and information for identifying the first beacon, a second beacon that is one of the beacons configured to be installed in the predetermined space transmits, upon receiving the third signal from the second mobile beacon carried by the second user, to the controller a fifth signal including the information for identifying the second mobile beacon and information for identifying the second beacon, and the controller receives the fourth signal and the fifth signal and, based on the information for identifying the first beacon included in the fourth signal and the information for identifying the second beacon included in the fifth signal, performs the face-to-face state determination when the first beacon and the second beacon are the same beacon or beacons that are set adjacent to each other.

According to the second aspect, the face-to-face state determination system detects the positions of two users carrying mobile beacons and determines a face-to-face state when the positions of the two users are adjacent to each other.

The aspects of the disclosure may be implemented by executing a program by an information processing device. That is, the configuration of the disclosure may be specified as a program for causing an information processing device to perform the processes performed by each means in the above-described aspects, or as a computer-readable recording medium on which the program is recorded. Furthermore, the configuration of the disclosure may be specified by a method in which an information processing device performs the processes performed by the above means. The configuration of the disclosure may be specified as a system including an information processing device that performs processes performed by the above means.

Advantageous Effects of Invention

According to the present invention, communication between people can be quantitatively measured.

BRIEF DESCRIPTION OF DRAWINGS

FIG. 6 is a diagram showing an example of an adjacent beacon information table stored in a storage unit of the server.

FIG. 14 is a diagram showing an example of a face-to-face state table.

DESCRIPTION OF EMBODIMENTS

Figure 1:
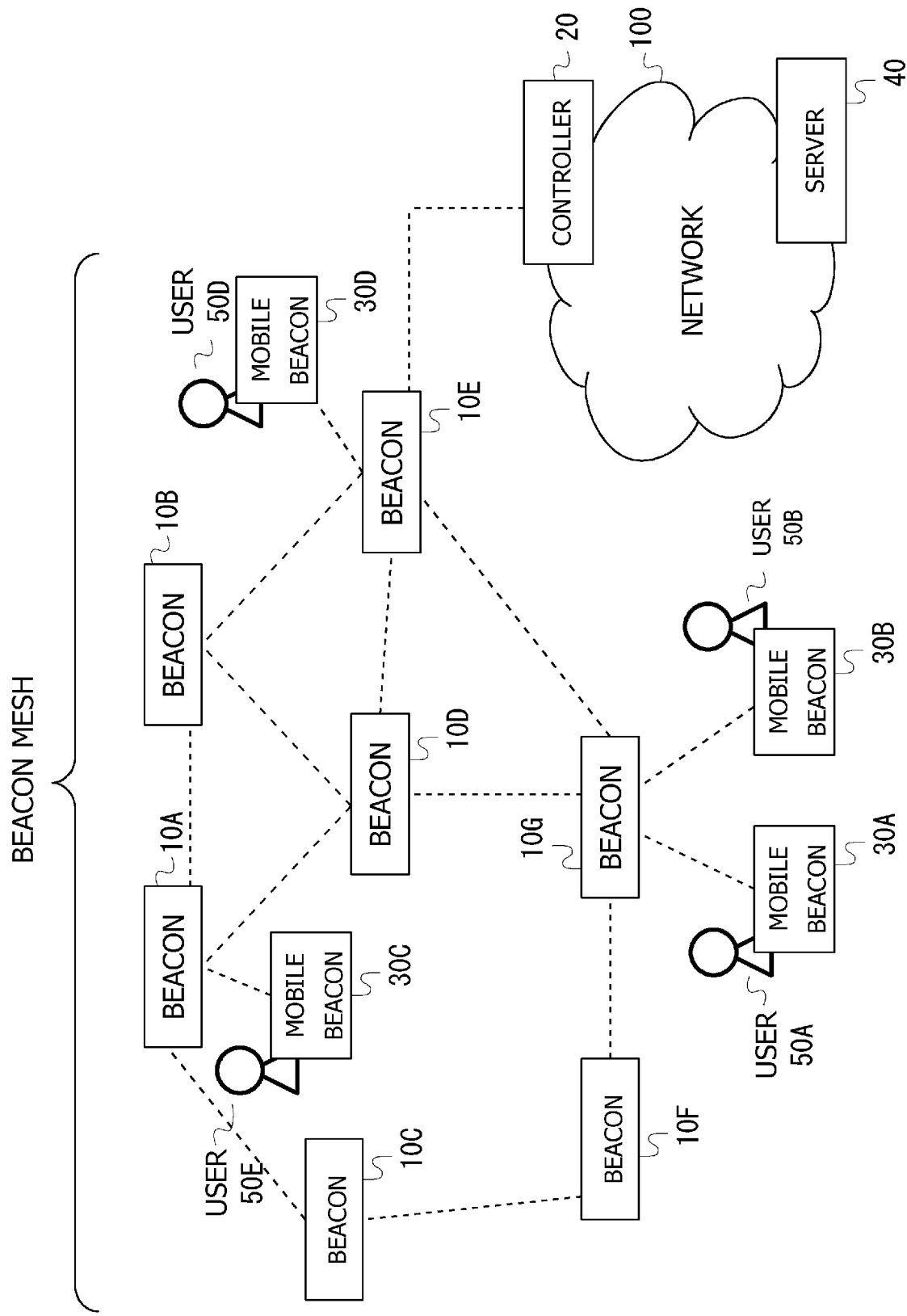
FIG. 1 is a diagram showing a configuration example of a system according to an embodiment.

Referring to the drawings, an embodiment according to the present invention is now described. The configuration of this embodiment is an example, and the configuration of the invention is not limited to the specific configuration of the disclosed embodiment. The present invention may be embodied by appropriately adopting specific configurations corresponding to the embodiment.

Embodiment

<System Configuration>

FIG. 1 is a diagram showing a configuration example of a system according to an embodiment. In the present embodiment, in addition to radio beacons transmitted and received for positioning and the like, transmission devices of such radio beacons are also referred to as beacons. The system according to the present embodiment includes beacons 10 (beacon 10A to beacon 10G in FIG. 1), a controller 20, mobile beacons 30 (mobile beacon 30A to mobile beacon 30D in FIG. 1), and a server 40. The mobile beacon 30A to the mobile beacon 30D are carried by a user 50A to a user 50E, respectively. When the users 50A to 50E are not distinguished from one another, they are simply referred to as the users 50. The system of this embodiment is a system for determining a face-to-face state between users 50 who carry mobile beacons 30. The beacons 10 are installed in a workplace such as an office. The beacons 10 are installed, for example, on desks, aisles, and the like in the office. The beacons 10A to 10G installed in the office form a multi-hop wireless network. The number of beacons 10, mobile beacons 30, and users 50 are not limited to those shown in FIG. 1.

The beacons 10 are installed on desks, in conference rooms, meeting spaces, aisles, corridors, and the like in the office. Each beacon 10 transmits a radio beacon including the identification information for identifying the beacon 10 and the transmission date and time. Furthermore, each beacon 10 according to the present embodiment has a function of mutually communicating with other beacons 10 or other mobile beacons 30 installed within its radio coverage range. The beacons 10 form a multi-hop wireless network as a whole. Furthermore, each of the beacons 10 is arranged within the radio coverage range of at least one of the other beacons 10. When a beacon 10 is placed in one position and there is no other beacon 10 installed at a different position within the radio coverage range of the beacon 10, one or more new beacons 10 may be installed within the radio coverage range, so that every beacon 10 is positioned within the radio coverage range of at least one of the other beacons 10. A beacon 10 may receive from a mobile beacon 30 a signal including the identification information of this mobile beacon 30. The beacon 10 may transmit to another beacon 10 a signal including the identification information of the beacon 10 itself together with the identification information of the mobile beacon 30. In addition, a beacon 10 may receive from a mobile beacon 30 a signal including the identification information of this mobile beacon, the identification information of a different mobile beacon 30 received by the mobile beacon 30, and the reception intensity of the signal from the different mobile beacon 30. Furthermore, the beacon 10 may transfer a signal received from a mobile beacon 30 toward other beacons 10. A plurality of beacons that can mutually communicate with each other are also collectively referred to as a beacon mesh.

A beacon 10 transmits a beacon signal including the identification information of the beacon 10. This identification information is information that can uniquely identify the beacon 10. The beacon 10 transmits a beacon signal and communicates with other devices (e.g., beacons 10) according to a wireless communication standard, such as Bluetooth (registered trademark), ZigBee (registered trademark), or wireless LAN. In the present embodiment, the beacons 10 use Bluetooth Low Energy as the wireless communication standard and may transmit advertising packets as beacon signals. The beacons 10 may be driven by batteries, for example.

The controller 20 is a device that centrally controls the operations of the plurality of beacons 10 and the plurality of mobile beacons 30. For example, the controller 20 transmits specific information including identification information specifying one of the beacons 10 and the mobile beacons 30 and predetermined information to the surrounding beacons 10. A beacon 10 relays the received specific information to the surrounding beacons 10. When a beacon 10 receives specific information including the identification information specifying the beacon 10 itself, the beacon 10 performs a predetermined process based on the specific information. The specific information may include, for example, information that controls the operation of the beacon 10. The controller 20 operates as a gateway that connects the beacon mesh and a network 100. The controller 20 is arranged at a position where it can communicate with at least one beacon 10.

Each mobile beacon 30 is carried by a user 50. The mobile beacon 30 may be a card-type beacon, which can be put on the front of the user with a neck strap. The antenna of the mobile beacon 30 transmits and receives radio waves in an omnidirectional manner. The mobile beacon 30 may also be carried in a pocket of the user's clothing or the like. In this example, the mobile beacon 30 is carried on the front side of the user. A mobile beacon 30 transmits a radio beacon including the identification information for identifying the mobile beacon 30 and the transmission date and time. Furthermore, each mobile beacon 30 according to the present embodiment has a function of mutually communicating with other beacons 10 or other mobile beacons 30 within the radio coverage range. The mobile beacons 30 form a multi-hop wireless network as a whole. In this example, each mobile beacon 30 is assumed to be in the radio coverage range of at least one of the other beacons 10. That is, it is assumed that the user 50 carrying the mobile beacon 30 is in the office where the beacons 10 are installed. The mobile beacon 30 may receive from a different mobile beacon 30 a signal including the identification information of this different mobile beacon 30. The mobile beacon 30 may transmit toward beacons 10 a signal including the identification information of the mobile beacon 30 itself, the identification information of the different mobile beacon 30, and the reception intensity of the signal from the different mobile beacon 30.

The server 40 may receive, through the beacon mesh and the controller 20, a signal from a beacon 10 that includes the identification information of a mobile beacon 30 and the identification information of the beacon 10, and a signal from a mobile beacon 30 that includes the identification information of the mobile beacon 30, the identification information of a different mobile beacon 30, and the reception intensity of the signal from the different mobile beacon 30.

Based on the signals from beacons 10, the server 40 detects the current positions of the users 50 carrying the mobile beacons 30. The server 40 stores in advance information indicating the relationship between the identification information of each beacon 10 and its installation position in a storage means or the like. The server 40 also stores the identification information of each mobile beacon 30 in association with the information on the user 50 who carries the mobile beacon 30 in the storage means or the like. Based on these information pieces, the server 40 can identify the current position of each user 50. Furthermore, when the server 40 does not receive a signal including the identification information of a specific mobile beacon 30 for a predetermined time or longer, the server 40 determines that the user 50 carrying this mobile beacon 30 is not present in (e.g., out of) the office where the beacons 10 are installed. If such a signal is not received for a predetermined time or longer, the mobile beacon 30 can run out of battery or be broken, but this is not considered here.

Based on a signal from a mobile beacon 30, the server 40 can determine a face-to-face state between the user 50 carrying this mobile beacon 30 and the user 50 carrying another mobile beacon 30 included in the signal. The server 40 can determine a face-to-face state based on the reception intensity and the like included in the signal.

<Functional Configuration of Beacon>

Figure 2:
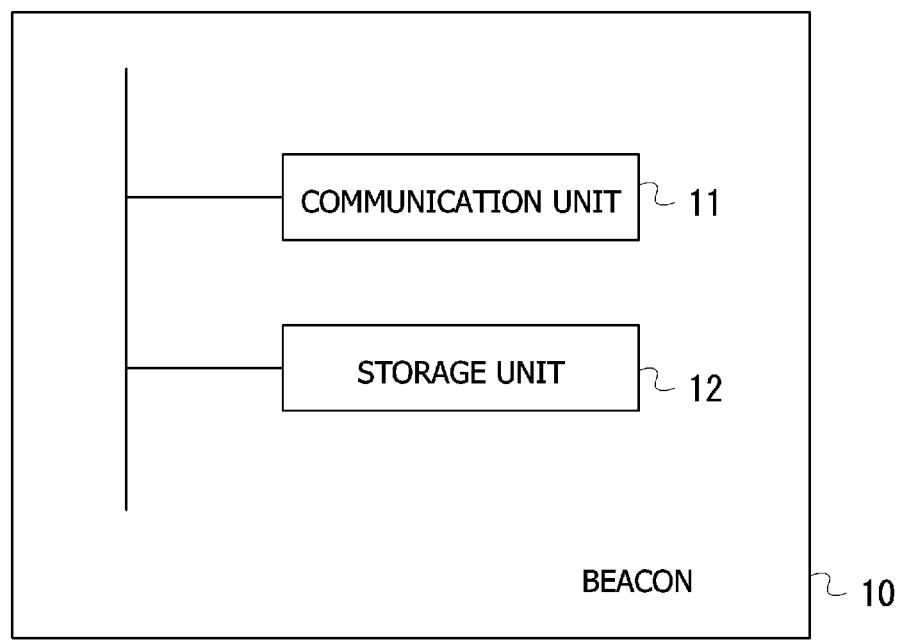
FIG. 2 is a diagram showing an example of the functional block of a beacon according to the embodiment.

FIG. 2 is a diagram showing an example of the functional block of a beacon according to the embodiment. The beacons 10 are installed on desks, in conference rooms, meeting spaces, aisles, corridors, and the like in the office at intervals of less than or equal to a predetermined radio coverage range in which mutual communication is available. The beacons 10 are installed and fixed at their respective positions. For example, the beacons 10 are installed at intervals of about 3 m depending on the installation location. Each beacon 10 includes a communication unit 11 and a storage unit 12. The communication unit 11 may be implemented by application software (also referred to as a program) installed in the beacon 10 using the communication function of the beacon 10, for example.

The communication unit 11 bidirectionally transmits and receives information to and from other beacons 10, mobile beacons 30, and the controller 20. The communication unit 11 may perform mutual communication based on a profile such as GATT in Bluetooth Low Energy (BLE), for example. The communication unit 11 may perform connection-oriented communication. In addition, the communication unit 11 transmits a radio beacon including the identification information for identifying its beacon 10 based on the information stored in the storage unit 12. The radio beacon may include date and time information indicating the transmission time and the like. A radio beacon is a type of signal. Specifically, a technique such as BLE may be used, and broadcast communication of radio beacons may be performed.

The communication unit 11 may also send information held in the storage unit 12 to the controller 20 via the beacon mesh network in response to a request from the controller 20. When receiving a signal from another beacon or the like, the communication unit 11 can transmit (transfer, perform multi-hop communication of) the signal to other beacons 10 or the controller 20. The communication unit 11 stores in the storage unit 12 the identification information of the information that has been transferred. When transferring information, the communication unit 11 checks whether the identification information of this information matches any of the identification information of the information that has been transferred to the storage unit 12 in the past. If the information is information that has been transferred in the past, the communication unit 11 does not transfer this information. This avoids the same information being continuously transferred within the beacon mesh.

The communication unit 11 receives from a mobile beacon 30 a signal including the identification information of this mobile beacon 30. The signal may be a radio beacon. The communication unit 11 transmits toward other beacons 10 a signal including the identification information of its beacon 10 together with the identification information of the mobile beacon 30. The communication unit 11 also receives from a mobile beacon 30 a signal including the identification information of this mobile beacon, the identification information of a different mobile beacon 30 received by this mobile beacon 30, and the reception intensity of the signal from the different mobile beacon 30. The communication unit 11 also transfers the signal received from the mobile beacon 30 toward other beacons 10. The communication unit 11 stores in the storage unit 12 the information included in the received signal, the reception intensity of the signal, and the like.

The storage unit 12 is a non-volatile memory, and may be implemented by an electrically erasable programmable read-only memory (EEPROM) such as a flash memory included in a microprocessor. The storage unit 12 stores predetermined identification information of its beacon 10, a preset value of radio field intensity used when the communication unit 11 transmits radio beacons, and the like. The storage unit 12 also stores the information included in the received signals, the reception intensities of the signals, and the like.

<Functional Configuration of Controller>

Figure 3:
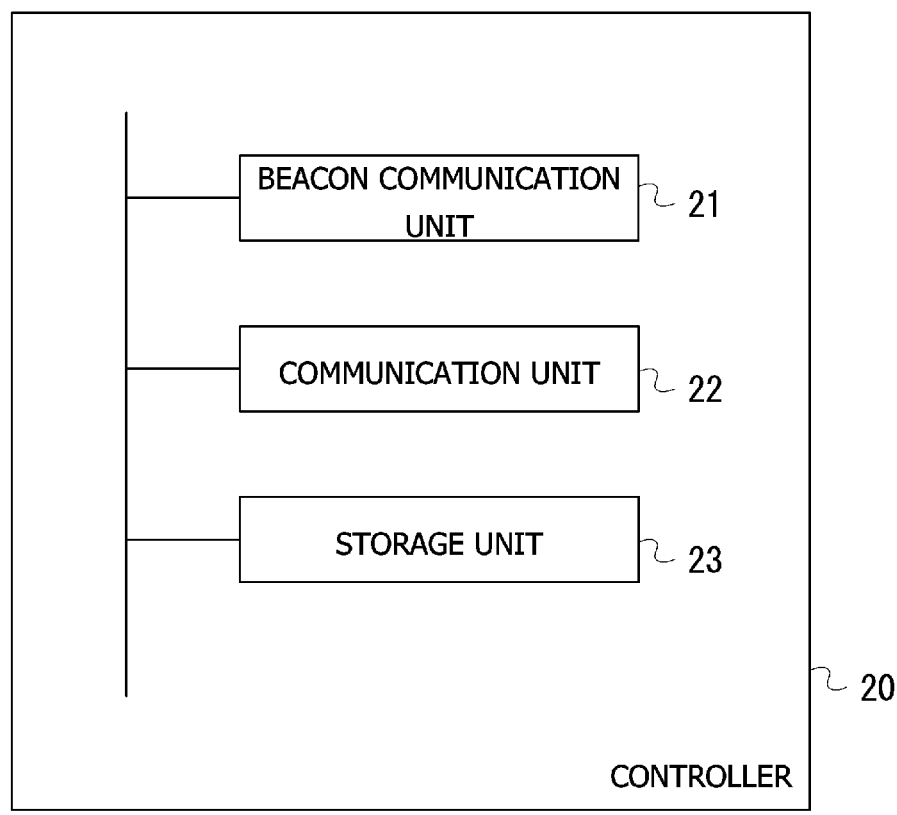
FIG. 3 is a diagram showing an example of the functional block of a controller according to the embodiment.

FIG. 3 is a diagram showing an example of the functional block of a controller according to the embodiment. The controller 20 may be a general computer, for example, and includes a beacon communication unit 21, a communication unit 22, and a storage unit 23.

The beacon communication unit 21 performs bidirectional communication with the beacons 10. That is, the beacon communication unit 21 may transmit a signal including specific information and receive from a beacon 10 a signal including alive or dead information and information held by the beacon 10. The controller 20 may be connected to one beacon 10 by wire or the like so as to communicate with the beacon 10.

The communication unit 22 transmits and receives information to and from the server 40 or a device (not shown) via a network 100, such as the Internet or a dedicated line. The communication unit 22 also transmits presence signals and state signals received from beacons 10 in the beacon mesh to the server 40. The presence signals and the state signals will be described below.

The storage unit 23 may be implemented by a hard-disk drive (HDD), a solid state drive (SSD), or a flash memory, for example. The storage unit 23 stores the position information indicating the installation positions of the beacons 10, operation settings, and the like in association with the identification information (beacon IDs) of the respective beacons.

<Functional Configuration of Mobile Beacon>

Figure 4:
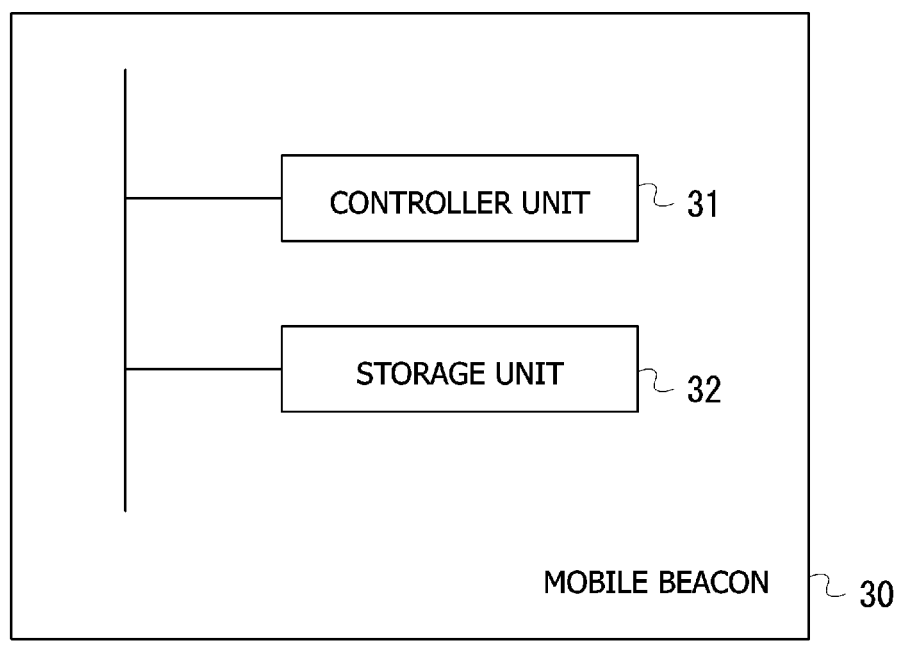
FIG. 4 is a diagram showing an example of the functional block of a mobile beacon according to the embodiment.

FIG. 4 is a diagram showing an example of the functional block of a mobile beacon according to the embodiment. A mobile beacon 30 may be connected to a neck strap, for example, of a user 50 and carried. The mobile beacon 30 may also be put in a pocket of clothing or the like of the user 50. The mobile beacon 30 includes a communication unit 31 and a storage unit 32. The communication unit 31 may be implemented by application software (also referred to as a program) installed in the mobile beacon 30 using the communication function of the mobile beacon 30, for example.

The communication unit 31 bidirectionally transmits and receives information to and from mobile beacons 30, beacons 10, and the controller 20. The communication unit 31 may perform mutual communication based on a profile such as GATT in Bluetooth Low Energy (BLE), for example. The communication unit 31 may perform connection-oriented communication. In addition, the communication unit 31 transmits a radio beacon including the identification information for identifying its mobile beacon 30 based on the information stored in the storage unit 32. The radio beacon may include date and time information indicating the transmission time and the like. A radio beacon is a type of signal. Specifically, a technique such as BLE may be used, and broadcast communication of radio beacons may be performed.

The communication unit 31 may also send information held in the storage unit 32 to the controller 20 via the beacon mesh network in response to a request from the controller 20. When receiving a signal from another beacon or the like, the communication unit 31 can transmit (transfer, perform multi-hop communication of) the signal to beacons 10 or the controller 20. The communication unit 31 stores in the storage unit 12 the identification information of the information that has been transferred. When transferring information, the communication unit 31 checks whether the identification information of the information matches any of the identification information of the information that has been transferred to the storage unit 32 in the past. If the information is information that has been transferred in the past, the communication unit 31 does not transfer this information.

The communication unit 31 may receive a signal from a different mobile beacon 30 including the identification information of this different mobile beacon 30. The signal may be a radio beacon. The communication unit 31 transmits toward the beacons 10 a signal including the identification information of the different mobile beacon 30, the reception intensity of the signal from the different mobile beacon 30, and the identification information of its mobile beacon 30. The communication unit 31 stores in the storage unit 32 the information included in the received signal, the reception intensity of the signal, and the like.

The storage unit 32 is a non-volatile memory, and may be implemented by an electrically erasable programmable read-only memory (EEPROM) such as a flash memory included in a microprocessor. In addition, the storage unit 32 stores predetermined identification information of its mobile beacon 30, a preset value of radio field intensity used when the communication unit 31 transmits radio beacons, and the like. The storage unit 32 also stores the information included in the received signals, the reception intensities of the signals, and the like.

<Functional Configuration of Server>

Figure 5:
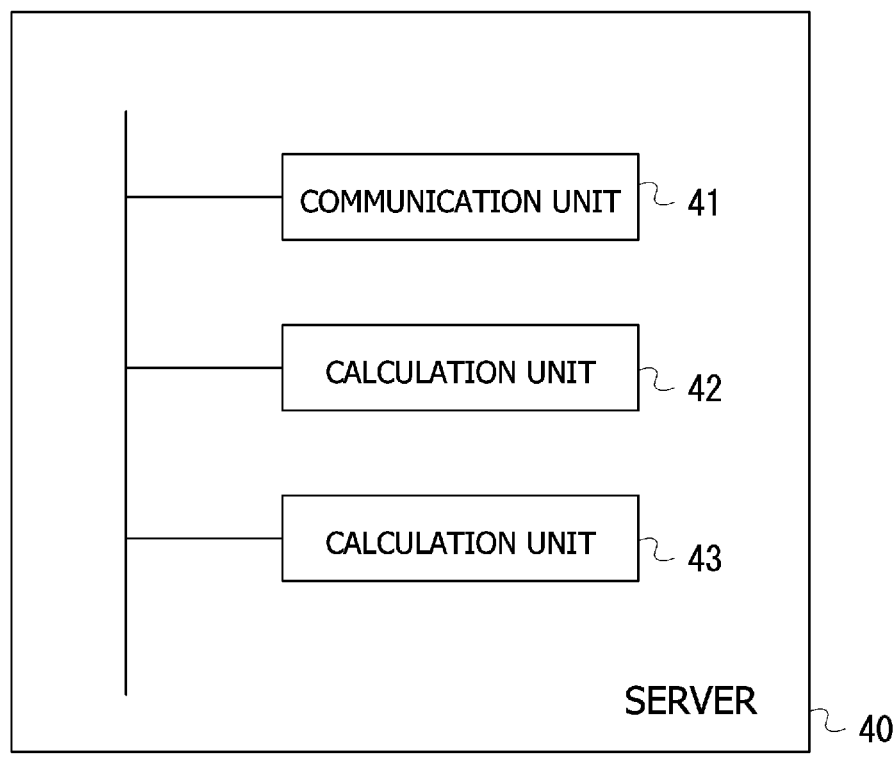
FIG. 5 is a diagram showing an example of the functional block of a server according to the embodiment.

FIG. 5 is a diagram showing an example of the functional block of a server according to the embodiment. The server 40 may be a stationary computer, for example, and includes a communication unit 41, a calculation unit 42, and a storage unit 43. The controller 20 and the server 40 may be integrated and operate as one controller.

The communication unit 41 transmits and receives information to and from the controller 20 and the like via the network 100, such as the Internet.

The calculation unit 42 performs predetermined calculation based on information from beacons 10 and mobile beacons 30. The calculation unit 42 may determine a face-to-face state between a user 50 and another user 50 who carry mobile beacons 30. In addition, the calculation unit 42 calculates the current position of a user 50 who carries a mobile beacon 30.

The storage unit 43 may consist of an HDD, an SSD, a flash memory, or the like, and store the information received from the mobile beacons 30 via the beacon mesh and the controller 20, and the information indicating the positions of the mobile beacons 30 calculated based on the received information. The storage unit 43 may also pre-store information on the positions where the beacons 10 are installed. The storage unit 43 stores the identification information (beacon ID) of each beacon 10 in the beacon mesh in association with the position information indicating the installation position of the beacon 10 and the like. The storage unit 43 stores each beacon 10 in association with the beacons 10 adjacent to the beacon 10 in an adjacent beacon information table, for example. Furthermore, the storage unit 43 may compile and store, for each mobile beacon 30, the information from the mobile beacon 30 and the information from beacons 10.

FIG. 6 is a diagram showing an example of an adjacent beacon information table stored in the storage unit of the server. In the adjacent beacon information table T100 of FIG. 6, the beacon name of each beacon 10 (identification information of the beacon 10) is associated with the beacon names of the beacons 10 adjacent to the beacon. For example, it can be seen that Beacon A is adjacent to Beacon B, Beacon C, and Beacon D.

<Device Configuration>

The controller 20 and the server 40 may be implemented by smartphones, mobile phones, tablet terminals, car navigation devices, personal digital assistants (PDAs), dedicated or general-purpose computers, such as personal computers (PCs), or electronic devices equipped with computers. The server 40 may be implemented by a dedicated or general-purpose computer such as a PC or a work station (WS), or an electronic device equipped with a computer.

Figure 7:
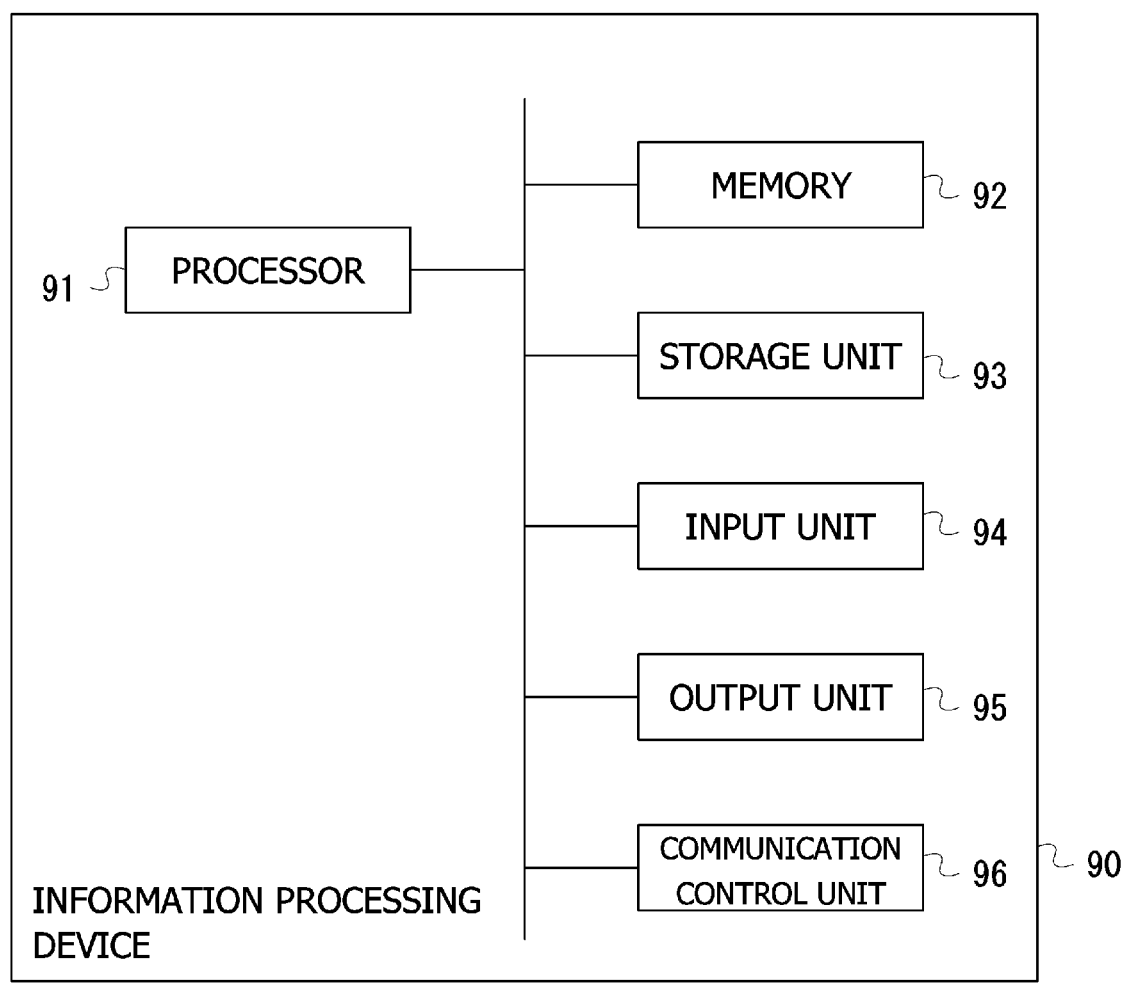
FIG. 7 is a diagram showing a hardware configuration example of an information processing device.

FIG. 7 is a diagram showing a hardware configuration example of an information processing device. The information processing device 90 shown in FIG. 7 has the configuration of a general computer. The controller 20 and the server 40 may be implemented by the information processing device 90 shown in FIG. 7. The information processing device 90 includes a processor 91, a memory 92, a storage unit 93, an input unit 94, an output unit 95, and a communication control unit 96. They are connected to each other by a bus. The memory 92 and the storage unit 93 are computer-readable recording media. The hardware configuration of the information processing device is not limited to the example shown in FIG. 7, and components may be omitted, replaced, or added as appropriate.

The information processing device 90 provides functions corresponding to predetermined purposes when the processor 91 loads a program stored in the recording medium into the work area of the memory 92 and executes the program so that the components and the like are controlled through the execution of the program.

The processor 91 may be a central processing unit (CPU) or a digital signal processor (DSP), for example.

The memory 92 may include a random access memory (RAM) and a read-only memory (ROM). The memory 92 is also referred to as a main storage device.

The storage unit 93 may be an erasable programmable ROM (EPROM), a hard disk drive (HDD), or a solid state drive (SSD). In addition, the storage unit 93 may include a removable medium, that is, a portable recording medium. The removable medium may be a universal serial bus (USB) memory or a disc recording medium, such as a compact disc (CD) or a digital versatile disc (DVD). The storage unit 93 is also referred to as a secondary storage device.

The storage unit 93 stores various programs, various data pieces, and various tables in a recording medium in a readable and writable manner. The storage unit 93 stores an operating system (OS), various programs, various tables, and the like. The information stored in the storage unit 93 may be stored in the memory 92. Furthermore, the information stored in the memory 92 may be stored in the storage unit 93.

The operating system is software that serves as an intermediary between software and hardware, manages memory space, manages files, and manages processes and tasks, for example. The operating system includes a communication interface. The communication interface is a program that exchanges data with other external devices and the like connected via the communication control unit 96. The external devices and the like may include other information processing devices and external storage devices, for example.

The input unit 94 may include a keyboard, a pointing device, a wireless remote controller, a touch panel, and the like. The input unit 94 may also include a video or image input device such as a camera, or an audio input device such as a microphone.

The output unit 95 may include a display device, such as a cathode ray tube (CRT) display, a liquid crystal display (LCD), a plasma display panel (PDP), and an electroluminescence (EL) panel, and an output device such as a printer. The output unit 95 may also include an audio output device such as a speaker.

The communication control unit 96 connects to another device and controls communication between the information processing device 90 and the device. The communication control unit 96 may be a local area network (LAN) interface board, a wireless communication circuit for wireless communication, such as Bluetooth (registered trademark), or a communication circuit for telephone communication, for example. The LAN interface board and the wireless communication circuit are connected to a network such as the Internet.

The computers that implement the controller 20 and the server 40 perform each function when the processor loads a program stored in the secondary storage device into the main storage device and executes the program. The storage unit of each device is provided in the storage area of the main storage device or the secondary storage device.

Example of Mobile Beacon Operation

Figure 8:
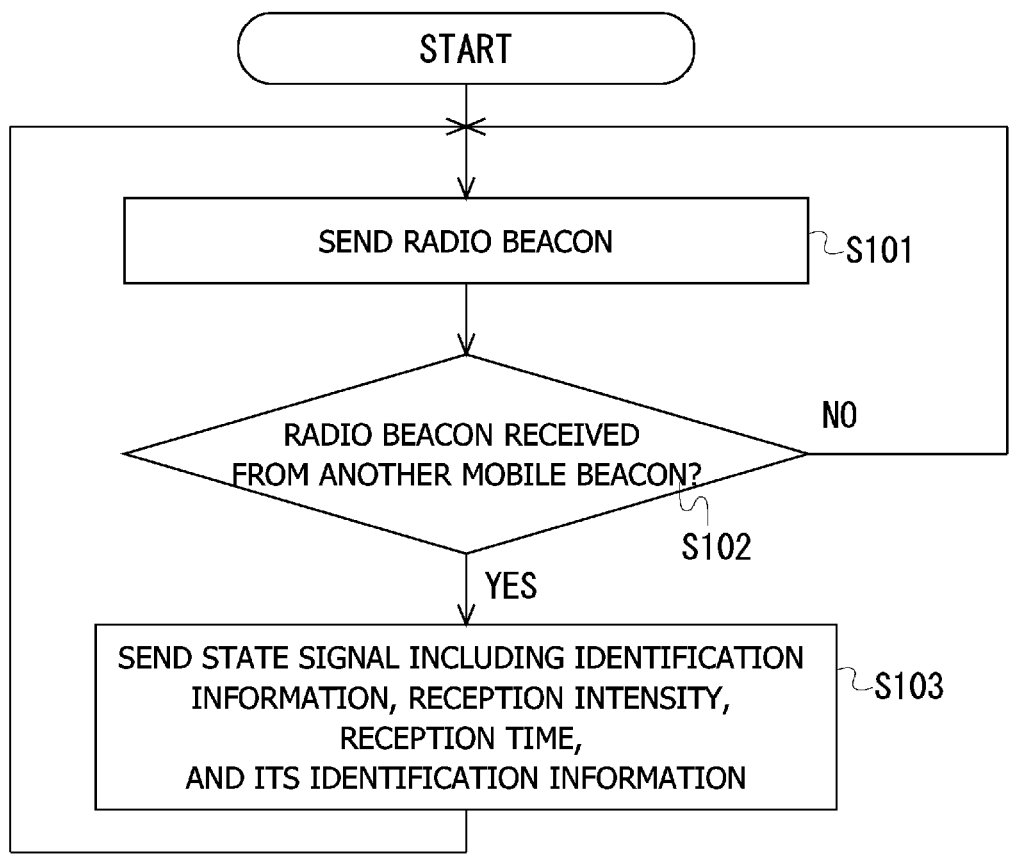
FIG. 8 is a diagram showing an example of an operation flow of a mobile beacon in the system of the embodiment.

FIG. 8 is a diagram showing an example of an operation flow of a mobile beacon in the system of the embodiment. A mobile beacon 30 is carried by a user 50 who is in the office where the beacons 10 are installed.

At S101, the communication unit 31 of the mobile beacon 30 transmits a radio beacon including the identification information of the mobile beacon 30. Instead of the radio beacon, it may be a signal including the identification information. The communication unit 31 may continually transmit the signal at predetermined time intervals. The identification information of the mobile beacon 30 included in the radio beacon is obtained by the communication unit 31 from the storage unit 32.

At S102, the communication unit 31 determines whether a radio beacon has been received from a different mobile beacon 30. Instead of the radio beacon, it may be a signal including the identification information of a different mobile beacon 30. If a radio beacon has been received from a different mobile beacon 30 (YES at S102), the process proceeds to S103. If a radio beacon has not been received from a different mobile beacon 30 (NO at S102), the process returns to S101.

At S103, when the communication unit 31 receives a radio beacon from a different mobile beacon 30, the communication unit 31 extracts the identification information of the different mobile beacon 30 from the radio beacon. In addition, the communication unit 31 measures the reception intensity of the radio beacon. The communication unit 31 stores in the storage unit 32 the extracted identification information of the different mobile beacon 30, the reception intensity of the radio beacon, and the reception time of the radio beacon. The communication unit 31 transmits a signal (as a state signal) including the extracted identification information of the different mobile beacon 30 (the identification information of the mobile beacon 30 that has transmitted the radio beacon), the reception intensity of the radio beacon, the reception time of the radio beacon, and the identification information of its mobile beacon 30. The identification information of its mobile beacon 30 is the identification information of the mobile beacon 30 that has generated the state signal. The state signal includes "the identification information of the mobile beacon 30 that has transmitted the radio beacon", "the reception intensity of the radio beacon", "the reception time of the radio beacon", and "the identification information of the mobile beacon that has generated the state signal". The identification information of its mobile beacon 30 included in the state signal is obtained by the communication unit 31 from the storage unit 32. The process then returns to S101. The communication unit 31 transmits the state signal to the controller 20 (or the server 40). The state signal includes the identification information of the signal itself. The process then returns to S101.

The mobile beacon 30 continually transmits its radio beacon toward other mobile beacons 30 and beacons 10. In addition, when receiving a radio beacon from another mobile beacon 30, the mobile beacon 30 generates a state signal and transmits it toward beacons 10. This state signal is transferred to the server 40 via beacons 10 in the beacon mesh and the controller 20. The state signal is used in the server 40 to determine a face-to-face state.

Beacon Operation Example

Figure 9:
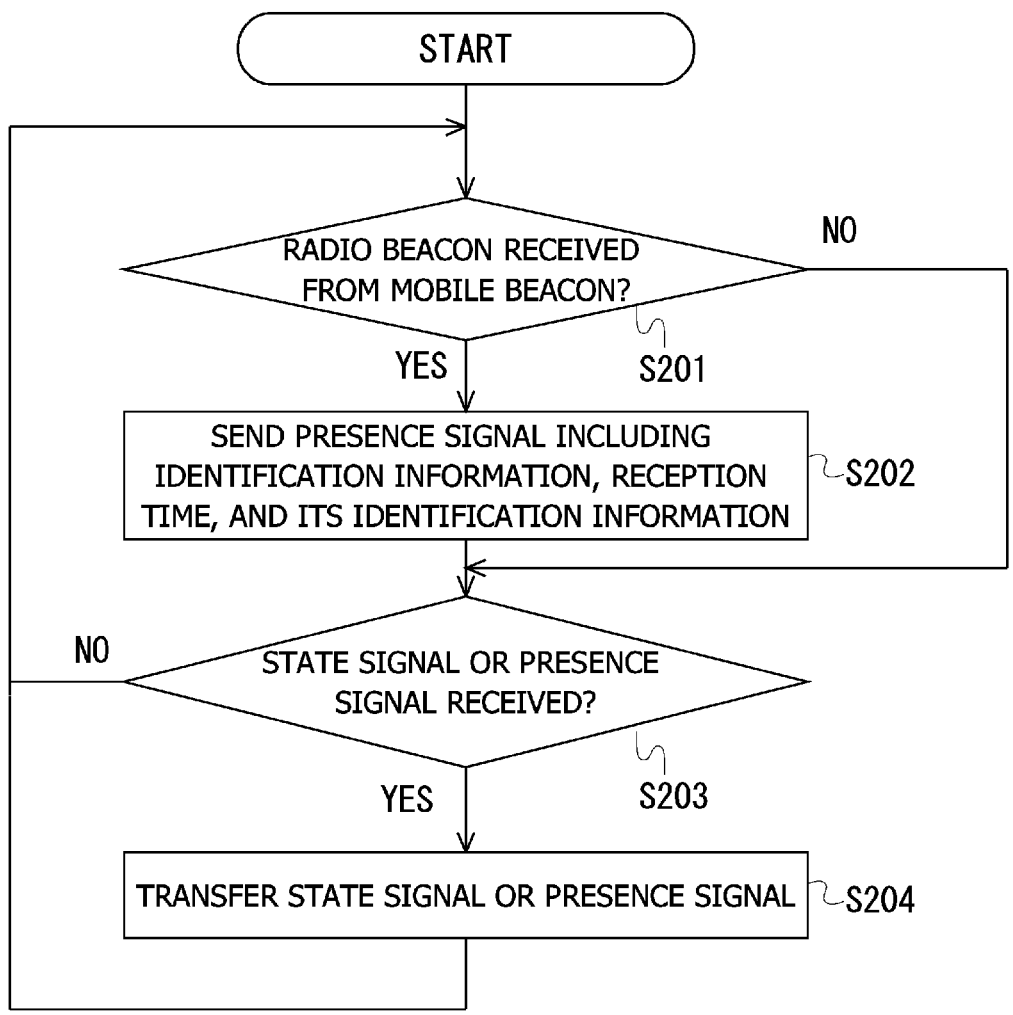
FIG. 9 is a diagram showing an example of an operation flow of a beacon in the system of the present embodiment.

FIG. 9 is a diagram showing an example of an operation flow of a beacon in the system of the present embodiment. The beacons 10 are installed and fixed on desks, in conference rooms, and the like in the office. The beacons 10 collectively form a beacon mesh.

At S201, the communication unit 11 of the beacon 10 determines whether a radio beacon has been received from a mobile beacon 30. Instead of a radio beacon, it may be a signal including the identification information of a mobile beacon 30. If a radio beacon has been received from a mobile beacon 30 (YES at S201), the process proceeds to S202. If a radio beacon has not been received from a mobile beacon 30 (NO at S201), the process proceeds to S203.

At S202, when the communication unit 11 receives a radio beacon from a mobile beacon 30, the communication unit 11 extracts the identification information of this mobile beacon 30 from the radio beacon. The communication unit 11 stores the extracted identification information of the other mobile beacon 30 and the reception time of the radio beacon in the storage unit 12. The communication unit 11 transmits a signal (as a presence signal) including the extracted identification information of the mobile beacon 30 (the identification information of the mobile beacon 30 that has transmitted the radio beacon), the reception time of the radio beacon, and the identification information of its beacon 10. The identification information of its beacon 10 is the identification information of the beacon 10 that has generated the presence signal. The presence signal includes "the identification information of the mobile beacon 30 that has transmitted the radio beacon", "the reception time of the radio beacon", and "the identification information of the beacon 10 that has generated the presence signal". The communication unit 11 may measure the reception intensity of the radio beacon and include the reception intensity in the presence signal. The identification information of its beacon 10 included in the presence signal is obtained by the communication unit 11 from the storage unit 12. The process then proceeds to S203. The communication unit 11 transmits the presence signal to the controller 20 (or the server 40). The presence signal is used in the server 40 to detect the position where the user 50 carrying the mobile beacon 30 is present. The presence signal includes the identification information of the signal itself.

At S203, the communication unit 11 of the beacon 10 determines whether a state signal or a presence signal has been received from a mobile beacon 30 or another beacon 10. If a state signal or a presence signal has been received from a mobile beacon 30 or another beacon 10 (YES at S203), the process proceeds to S204. If a state signal or a presence signal has not been received from a mobile beacon 30 or another beacon 10 (NO at S204), the process returns to S201.

At S204, when the communication unit 11 receives a state signal or a presence signal from a mobile beacon 30 or another beacon 10, the communication unit 11 extracts the identification information of the signal. The communication unit 11 checks whether the extracted identification information is stored in the storage unit 12. If the extracted identification information is stored in the storage unit 12, the communication unit 11 discards the received signal. The process then returns to S201.

If the extracted identification information is not stored in the storage unit 12, the communication unit 11 stores this identification information in the storage unit 12. In addition, the communication unit 11 transmits (transfers) the received state signal or presence signal toward other beacons 10 or the controller 20. The process then returns to S201.

This reduces the possibility that the beacon 10 repeatedly transfers a state signal or a presence signal that has been previously transferred.

<Operation of Controller and Server>

Upon receiving a state signal or a presence signal from a beacon 10, the beacon communication unit 21 of the controller 20 extracts the identification information of the signal. The beacon communication unit 21 checks whether the extracted identification information is stored in the storage unit 23. If the extracted identification information is stored in the storage unit 23, the beacon communication unit 21 discards the received signal. If the extracted identification information is not stored in the storage unit 23, the beacon communication unit 21 stores this identification information in the storage unit 23. The beacon communication unit 21 also extracts the information included in the received state signal or presence signal and stores it in the storage unit 23. Furthermore, the communication unit 22 of the controller 20 transmits (transfers) the received state signal or presence signal to the server 40.

When the communication unit 41 of the server 40 receives the state signal or presence signal from the controller 20, the communication unit 41 extracts the information included in the received state signal or presence signal and stores it in the storage unit 43. The information included in a state signal (referred to as state information) is the information in which the identification information of the mobile beacon 30 that has transmitted the radio beacon, the reception intensity of the radio beacon, the reception time of the radio beacon, and the identification information of the mobile beacon 30 that has generated the state signal are associated with one another. The information included in a presence signal (referred to as presence information) is the information in which the identification information of the mobile beacon 30 that has transmitted the radio beacon, the reception time of the radio beacon, and the identification information of the beacon 10 that has generated the presence signal are associated with one another.

<Determination of Face-to-Face State>

Figure 10:
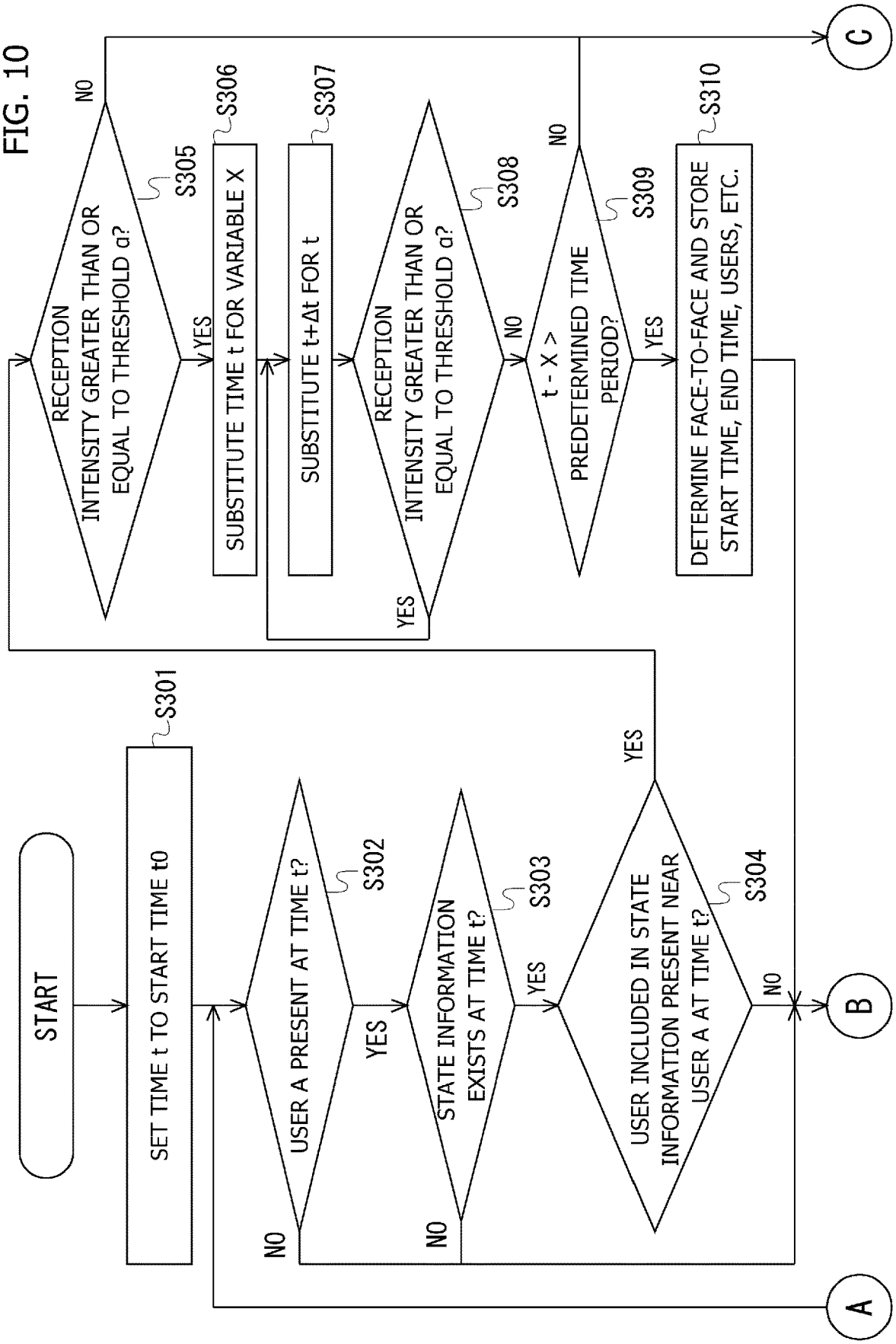
FIG. 10 is a diagram showing an example of a flow (1/2) in which the server in the system of the present embodiment determines a face-to-face state for a predetermined user.
Figure 11:
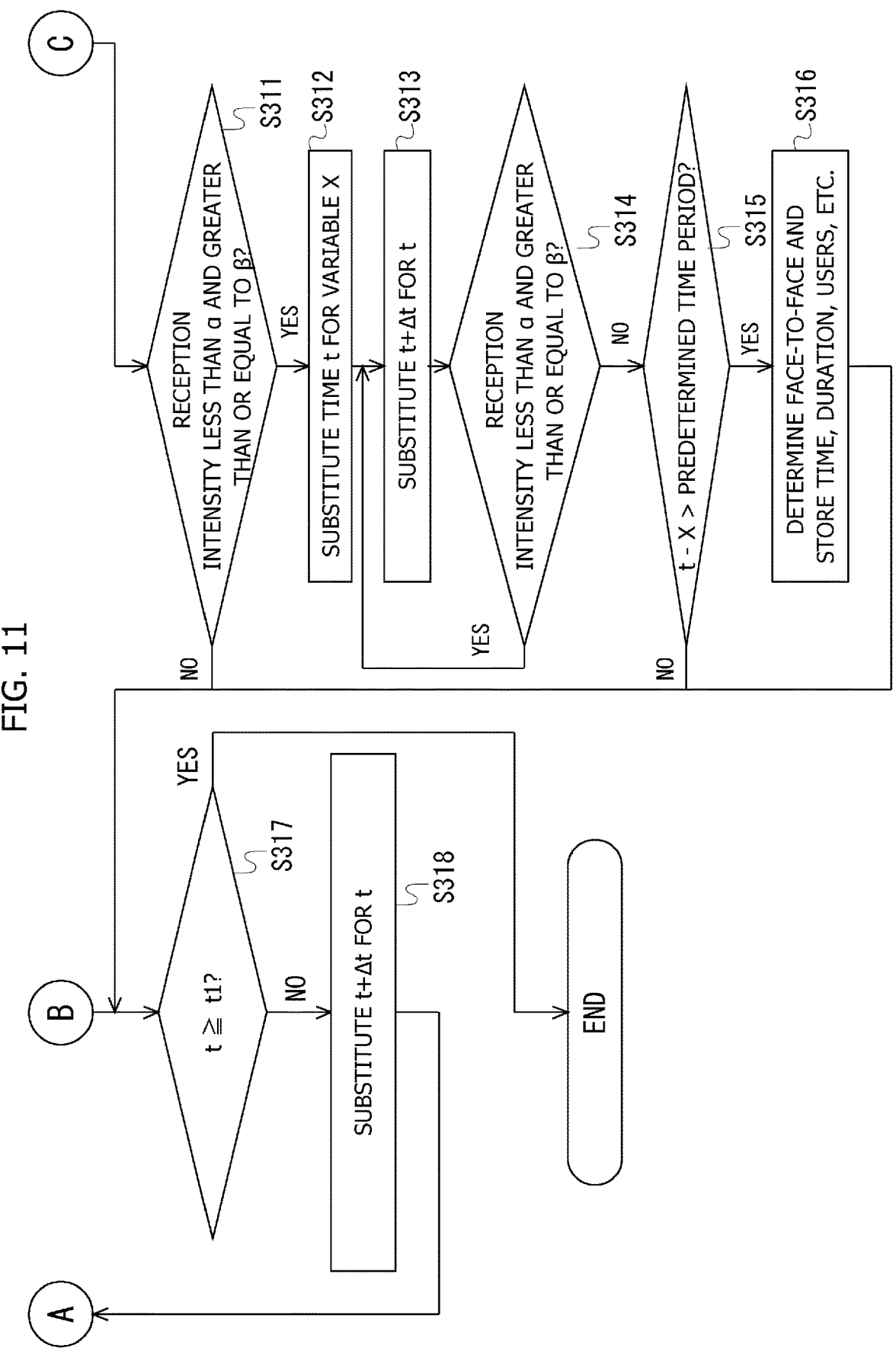
FIG. 11 is a diagram showing an example of a flow (2/2) in which the server in the system of the present embodiment determines a face-to-face state for a predetermined user.

FIGS. 10 and 11 are diagrams showing an example of a flow in which the server in the system of the present embodiment determines a face-to-face state of a predetermined user. "A", "B", and "C" in FIG. 10 connect to "A", "B", and "C" in FIG. 11, respectively. Here, the server 40 determines a face-to-face state of User A (50A) carrying a mobile beacon 30A during a time period from Time t0 to Time t1. The time period for determining a face-to-face state (t1–t0) may be 24 hours or one month, for example. A face-to-face state is a condition (state) of two users who are present near each other in the office. As a face-to-face state of two users, the server 40 determines whether the two users are "face to face (facing each other)", "facing in one direction", or "other state (e.g., facing opposite directions)".

The server 40 extracts from the storage unit 43 the state information and the presence information of User A who carries the mobile beacon 30A, which are stored in the storage unit 43 in advance. The presence information to be extracted is the information in which the identification information of the mobile beacon 30 that has transmitted the radio beacon is the identification information of the mobile beacon 30A, and the reception time of the radio beacon is between Time t0 to Time t1. The state information to be extracted is the information in which the identification information of the mobile beacon 30 that has generated the state signal is the identification information of the mobile beacon 30A, and the reception time of the radio beacon is between Time t0 to Time t1. The server 40 may extract such information from the storage unit 43 as required.

At S301, the calculation unit 42 of the server 40 substitutes the start time t0 of the time period for determining a face-to-face state for a variable of Time t.

At S302, the calculation unit 42 determines whether User A is present in the office at Time t. The calculation unit 42 determines whether Time t is included as the reception time of the radio beacon in the presence information in which the identification information of the mobile beacon 30 that has transmitted the radio beacon is the identification information of the mobile beacon 30A. When Time t is not included as the reception time of the radio beacon (NO at S302), it is determined that the mobile beacon 30A is not present in the office where the beacons 10 are installed at Time t. That is, at Time t, it is determined that User A is not present in the office where the beacons 10 are installed. If User A is not present in the office at Time t, a face-to-face state is not determined at Time t. The process then proceeds to S317. When Time t is included as the reception time of the radio beacon (YES at S302), it is determined that the mobile beacon 30A is present in the office where the beacons 10 are installed at Time t. That is, at Time t, User A is determined to be present in the office where the beacons 10 are installed. At this time, the calculation unit 42 extracts the identification information of the beacon 10 that has generated the presence signal from the presence information in which the reception time of the radio beacon is Time t. The extracted identification information of the beacon 10 corresponds to the information indicating the position of the mobile beacon 30A at Time t (position information of User A). The process then proceeds to S303.

At S303, the calculation unit 42 determines whether the state information about User A exists at Time t. The calculation unit 42 determines whether Time t is included as the reception time of the radio beacon in the state information in which the identification information of the mobile beacon 30 that has generated the state signal is the mobile beacon 30A. When Time t is included as the reception time of the radio beacon (YES at S303), it is determined that the state information about User A exists at Time t. That is, at Time t, it is determined that the mobile beacon 30A carried by User A has received a radio beacon of the mobile beacon 30 carried by another user 50. In this example, it is assumed that another user 50 is User B (50B), and User B carries a mobile beacon 30B. The process then proceeds to S304. If Time t is not included as the reception time of the radio beacon (NO at S303), it is determined that state information about User A at Time t does not exist. That is, at Time t, it is determined that the mobile beacon 30A carried by User A has not received a radio beacon of the mobile beacon 30 carried by another user 50. That is, at Time t, it is determined that there is no other user near User A and User A is not facing any user, for example. The process then proceeds to S317.

At S304, the calculation unit 42 extracts the identification information of the mobile beacon 30 that has transmitted the radio beacon from the state information in which the identification information of the mobile beacon 30 that has generated the state signal is the mobile beacon 30A and the reception time of the radio beacon is Time t. From the presence information stored in the storage unit 43, the calculation unit 42 extracts the presence information in which the reception time of the radio beacon is Time t and the identification information of the mobile beacon 30 that has transmitted the radio beacon is the identification information extracted at this step. From the extracted presence information, the calculation unit 42 extracts the identification information of the beacon 10 that has generated the presence signal. Here, the extracted identification information of the beacon 10 corresponds to the information indicating the position of the mobile beacon 30B at Time t (position information of User B). From the identification information of the beacon 10 extracted at S302 (corresponding to the position information of User A) and the identification information of the beacon 10 extracted at this step (corresponding to the position information of User B), the calculation unit 42 determines whether the two beacons 10 are the same or adjacent to each other. Using the adjacent beacon information table T100 stored in the storage unit 43, the calculation unit 42 determines whether the identification information of the beacon 10 extracted at this step is associated with the identification information of the beacon 10 extracted at S302 as an adjacent beacon 10. In addition, the calculation unit 42 determines whether the identification information of the beacon 10 extracted at S302 is the same as the identification information of the beacon 10 extracted at this step. If it is associated as an adjacent beacon 10 or is the same as the identification information of the beacon 10 extracted at this step, the calculation unit 42 determines that User A is present near User B who carries the mobile beacon 30B included in the state information at Time t. If it is determined that User A and User B (another user) are near each other (YES at S304) at Time t, the process proceeds to S305. In other cases (NO at S304), the process proceeds to S317. In this case, it is determined that no other user is present near User A at Time t. When there is no other user nearby, a face-to-face state or the like is not determined.

At S305, the calculation unit 42 extracts the reception intensity of the radio beacon from the state information extracted at S304. The calculation unit 42 determines whether the extracted reception intensity is greater than or equal to a threshold value α. If the reception intensity is greater than or equal to the threshold value α (YES at S305), the process proceeds to S306. If the reception intensity is less than the threshold value α (NO at S305), the process proceeds to S311. A reception intensity of greater than or equal to the threshold value α indicates that the two users are face to face (facing each other).

Figure 12:
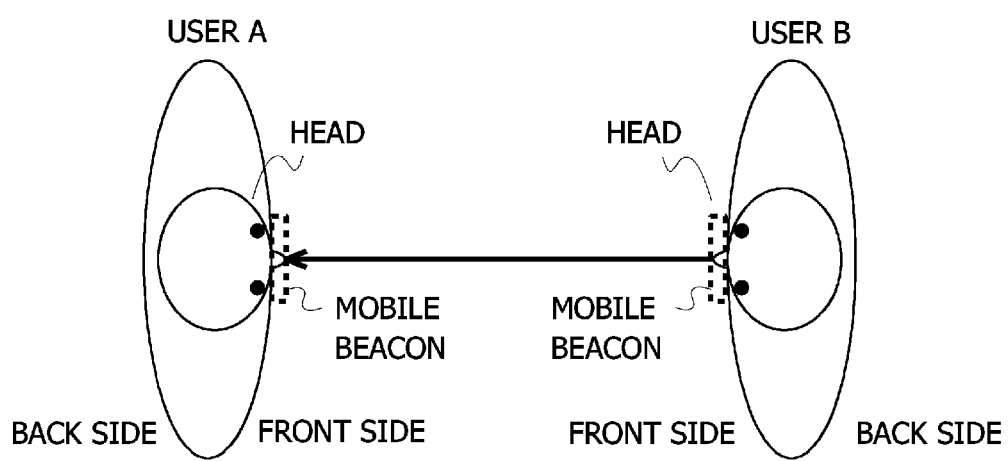
FIG. 12 is a diagram showing Example 1 in which two users are face to face.

FIG. 12 is a diagram showing Example 1 in which two users are face to face. FIG. 12 is a diagram of two users as viewed from above (in the direction from the ceiling). As for User A on the left, the back side faces in the left direction, and the front side faces in the right direction as viewed in the figure. As for User B on the right, the front side faces in the left direction, and the back side faces in the right direction as viewed in the figure. Each user carries a mobile beacon 30 on the chest on the front side. The radio wave (e.g., radio beacon) emitted from the mobile beacon 30 of User B reaches the mobile beacon 30 of User A without passing through a human body. At this time, the reception intensity of the radio wave on the mobile beacon 30 of User A is greater than or equal to the threshold value α. That is, the threshold value α is determined based on the reception intensity of the radio wave received when two users are face to face (when the radio wave is transmitted and received between mobile beacons 30 without passing through a human body).

Figure 13:
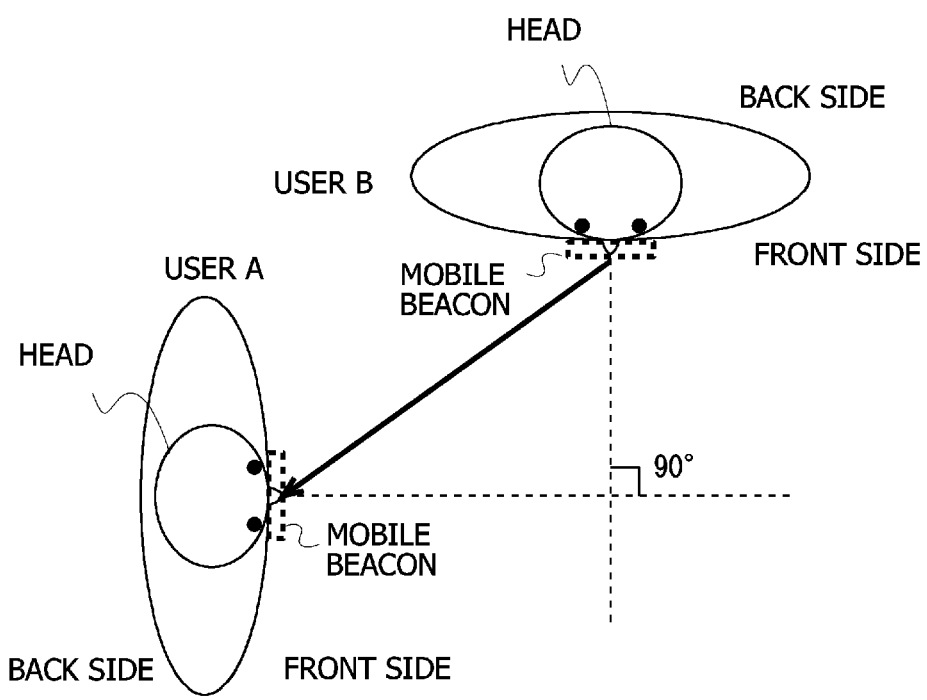
FIG. 13 is a diagram showing Example 2 in which two users are face to face.

FIG. 13 is a diagram showing Example 2 in which two users are face to face. FIG. 13 is a diagram of two users as viewed from above (in the direction from the ceiling). As for User A on the left, the back side faces in the left direction, and the front side faces in the right direction as viewed in the figure. As for User B on the right, the front side faces in the down direction, and the back side faces in the up direction as viewed in the figure. Each user carries a mobile beacon 30 on the chest on the front side. In a similar manner as FIG. 12, the radio wave (e.g., radio beacon) emitted from the mobile beacon 30 of User B reaches the mobile beacon 30 of User A without passing through a human body. Unlike infrared rays or the like, the antenna of the mobile beacon 30 transmits and receives radio waves in an omnidirectional manner, so that the reception intensity of the radio wave on the mobile beacon 30 of User A is still greater than or equal to the threshold value α. In this case, the two users are also determined as being face to face. Since radio waves are used for the communication between mobile beacons 30, even when another user is not directly in front of a user as shown in FIG. 13, the two users are determined as being face to face. In the example of FIG. 13, the front directions of the two users form an angle of 90 degrees, but the angle is not limited to 90 degrees as long as the radio wave can be directly transmitted and received without passing through a human body. In addition, since radio waves are used instead of infrared rays or the like, even when a mobile beacon 30 is placed in a pocket of clothing or the like, the reception intensity does not change significantly, enabling the determination of face-to-face information.

At S306, the calculation unit 42 substitutes Time t for a variable X. Time t represents the time when the state in which the two users are face to face starts.

At S307, the calculation unit 42 substitutes Time t+Δt for Time t. Δt is a time step. The time step may be the minimum time width in the recording of time, such as a reception time, in this system. Alternatively, the time step may be an integral multiple of the minimum time width. For example, Δt is one second. The same value as at S307 is used for Δt at subsequent S313 and S318.

At S308, from the storage unit 43 or the like, the calculation unit 42 extracts the state information in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t. The calculation unit 42 extracts the reception intensity of the radio beacon from the extracted state information. The calculation unit 42 determines whether the extracted reception intensity is greater than or equal to the threshold value α. If the reception intensity is greater than or equal to the threshold value α (YES at S308), the process returns to S307. In other cases (NO at S308), the process proceeds to S309. The other cases include, in addition to the case in which the reception intensity is less than the threshold value α, the case in which the state information does not exist in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t.

At S309, the calculation unit 42 determines whether the time period during which the reception intensity is greater than or equal to the threshold value α exceeds a predetermined time period. Here, when the time period during which the reception intensity is greater than or equal to the threshold value α exceeds the predetermined time period, it is determined that the two users are face to face. This is because if the time period during which the reception intensity is greater than or equal to the threshold value α is short (less than or equal to the predetermined time period), the two users may have just passed each other and cannot be determined as being face to face. The time period during which the reception intensity is greater than or equal to the threshold value α may be calculated by t−X. The predetermined time period may be 30 seconds, for example. If t−X is greater than the predetermined time period (YES at S309), the process proceeds to S310. In this case, the two users (User A and User B) are determined to have been face to face from Time X to Time t. If t−X is less than or equal to a predetermined time period, the process proceeds to S311. In this case, the two users (User A and User B) are determined as not being face to face.

At S310, the calculation unit 42 determines that the two users (User A and User B) are face to face, and stores the face-to-face state (face-to-face), the face-to-face start time (time X), the face-to-face end time (Time t), the users (User A and User B) in a face-to-face state table T200. The face-to-face state table T200 is stored in the storage unit 43. An example of the face-to-face state table T200 is described below.

FIG. 14 is a diagram showing an example of a face-to-face state table. As shown in FIG. 14, in the face-to-face state table T200, face-to-face state, start time, end time, and users are stored in association with one another. The face-to-face state indicates whether the two users are face to face (facing each other) or facing in one direction. The start time and end time indicate the time when the face-to-face state started and the time when the face-to-face state ended. The users indicate the users who were in the face-to-face state.

At S311, from the storage unit 43 or the like, the calculation unit 42 extracts the state information in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t. The calculation unit 42 extracts the reception intensity of the radio beacon from the extracted state information. The calculation unit 42 determines whether the extracted reception intensity is less than the threshold value $\alpha$ and greater than or equal to the threshold value $\beta$. If the reception intensity is less than the threshold value $\alpha$ and greater than or equal to the threshold value $\beta$ (YES at S311), the process proceeds to S312. In other cases (NO at S311), the process proceeds to S317. The other cases include, in addition to the case in which the reception intensity is less than the threshold value $\mu$, the case in which the state information does not exist in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t. A reception intensity of less than the threshold value $\alpha$ and greater than or equal to the threshold value $\mu$ indicates that the two users are facing in one direction. Here, $\alpha>\beta$.

Figure 15:
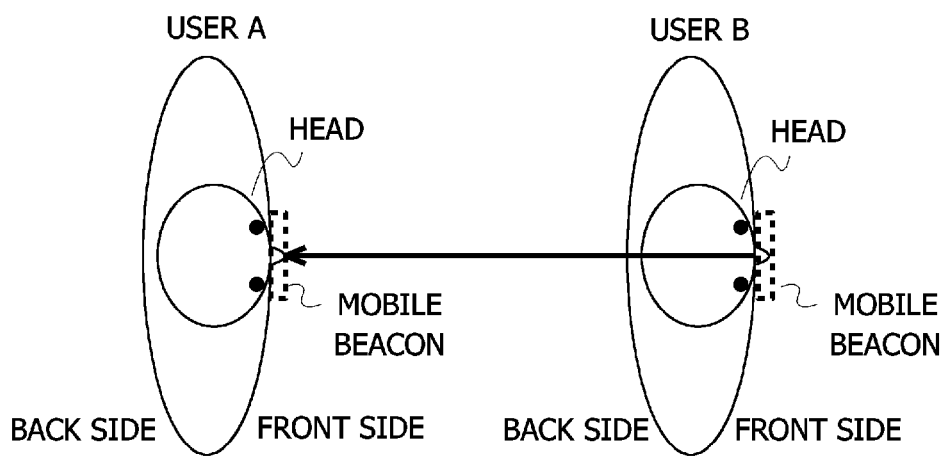
FIG. 15 is a diagram showing an example in which two users are facing in one direction.

FIG. 15 is a diagram showing an example in which two users are facing in one direction. FIG. 15 is a diagram of two users as viewed from above (in the direction from the ceiling). As for User A on the left, the back side faces in the left direction, and the front side faces in the right direction as viewed in the figure. As for User B on the right, the back side faces in the left direction, and the front side faces in the right direction as viewed in the figure. Each user carries a mobile beacon 30 on the chest on the front side. The radio wave (e.g., radio beacon) emitted from the mobile beacon 30 of User B passes through the body of User B and reaches the mobile beacon 30 of User A. At this time, the reception intensity of the radio wave on the mobile beacon 30 of User A is less than the threshold value $\alpha$ and greater than or equal to the threshold value $\beta$. Radio waves propagating through a human body are more attenuated than when propagating in the air.

Figure 16:
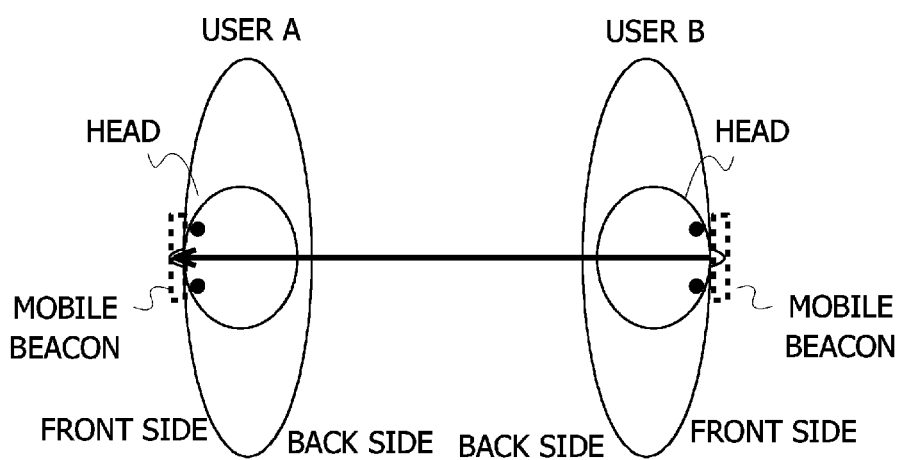
FIG. 16 is a diagram showing an example in which two users are facing in opposite directions.

FIG. 16 is a diagram showing an example in which two users are facing in opposite directions. FIG. 16 is a diagram of two users as viewed from above (in the direction from the ceiling). As for User A on the left, the front side faces in the left direction, and the back side faces in the right direction as viewed in the figure. As for User B on the right, the back side faces in the left direction, and the front side faces in the right direction as viewed in the figure. Each user carries a mobile beacon 30 on the chest on the front side. The radio wave (e.g., radio beacon) emitted from the mobile beacon 30 of User B passes through the bodies of User B and User A and reaches the mobile beacon 30 of User A. At this time, the reception intensity of the radio wave on the mobile beacon 30 of User A is less than the threshold value $\beta$. Radio waves propagating through a human body are more attenuated than when propagating in the air.

The threshold value $\alpha$ and the threshold value $\beta$ may be determined based on the reception intensity of the radio wave received when two users are face to face, the reception intensity of the radio wave received when two users are facing in one direction, and the reception intensity of the radio wave received when two users are facing in opposite directions, for example. Furthermore, the threshold value $\alpha$ and the threshold value $\beta$ may be determined based on the transmission radio wave intensity, the antenna performance of the mobile beacon 30, and the like.

At S312, the calculation unit 42 substitutes Time t for a variable X. Time t represents the time when the state in which the two users are facing in one direction starts.

At S313, the calculation unit 42 substitutes Time t+$\Delta$t for Time t.

At S314, from the storage unit 43 or the like, the calculation unit 42 extracts the state information in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t. The calculation unit 42 extracts the reception intensity of the radio beacon from the extracted state information. The calculation unit 42 determines whether the extracted reception intensity is less than the threshold value $\alpha$ and greater than or equal to the threshold value $\beta$. If the reception intensity is less than the threshold value $\alpha$ and greater than or equal to the threshold value $\beta$ (YES at S314), the process returns to S313. In other cases (NO at S314), the process proceeds to S317. The other cases include, in addition to the case in which the reception intensity is less than the threshold value $\beta$, the case in which the state information does not exist in which the identification information of the mobile beacon 30 that has generated the state signal is the mobile beacon 30A, the identification information of the mobile beacon 30 that has transmitted the radio beacon is the same mobile beacon 30B as at S304, and the reception time of the radio beacon is Time t.

At S315, the calculation unit 42 determines whether the time period during which the reception intensity is less than the threshold value $\alpha$ and greater than or equal to the threshold value $\beta$ exceeds a predetermined time period. Here, when the time period during which the reception intensity is less than the threshold value $\alpha$ and greater than or equal to the threshold value $\beta$ exceeds the predetermined time period, it is determined that the two users are facing in one direction. This is because if the time period during which the reception intensity is less than the threshold value $\alpha$ and greater than or equal to the threshold value $\beta$ is short (less than or equal to the predetermined time period), the two users may have only momentarily been near each other and cannot be determined as being facing in one direction. The time period during which the reception intensity is less than the threshold value $\alpha$ and greater than or equal to the threshold value $\beta$ may be calculated by t−X. The predetermined time period may be 30 seconds, for example. If t−X is greater than the predetermined time period (YES at S315), the process proceeds to S316. In this case, the two users (User A and User B) are determined to have been facing in one direction from Time X to Time t. If t−X is less than or equal to the predetermined time period, the process proceeds to S317. In this case, the two users (User A and User B) are determined as not being facing in one direction.

At S316, the calculation unit 42 determines that the two users (User A and User B) are facing in one direction, and stores the face-to-face state (one direction), the start time of the state of facing in one direction (Time X), the end time of the state of facing in one direction (Time t), and the users (User A and User B) in the face-to-face state table T200. The face-to-face state table T200 is stored in the storage unit 43.

At S317, the calculation unit 42 determines whether Time t has reached the end time t1 of the time period for determining a face-to-face state. If Time t has reached the end time t1 (t≥t1) (YES at S317), the process ends. If Time t has not reached the end time t1 (t<t1) (NO at S317), the process proceeds to S318.

At S313, the calculation unit 42 substitutes Time t+Δt for Time t. The process then returns to S302.

The calculation unit 42 determines a face-to-face state of User A as described above. The calculation unit 42 also determines face-to-face states for other users in the same manner. The determined face-to-face states are stored in the face-to-face state table T200.

In the flows described above, some steps may be omitted, or the order of steps may be changed.

Action and Effect of Embodiment

Each mobile beacon 30 of the present embodiment is carried by a user and transmits a radio beacon, which is received by beacons 10 or other mobile beacons 30. When a beacon 10 receives the radio beacon from the mobile beacon 30, the beacon 10 generates a presence signal and transmits it to the controller 20 and the server 40 via the beacon mesh. The presence signal is used to detect the position of the mobile beacon 30. When a different mobile beacon 30 receives the radio beacon from the mobile beacon 30, the different mobile beacon 30 generates a state signal and transmits it to the controller 20 and the server 40 via the beacon mesh. The state signal is used to determine a face-to-face state between users.

The system of the present embodiment uses signals of beacons to detect a face-to-face state and to communicate information on a face-to-face state. The system of this embodiment uses beacon signals and therefore does not use additional hardware configurations to detect face-to-face states. The system of the present embodiment can simplify the hardware configuration as compared to a system that detects a face-to-face state with infrared rays and transmits the detected information by another wireless method.

The server 40 of the present embodiment determines a face-to-face state of two users using the threshold value α and the threshold value β. The server 40 can determine three types of information as face-to-face states: facing each other (face-to-face), facing in one direction, and other.

The system of the present embodiment detects a face-to-face state using radio signals and is thus able to detect that two users are face to face even when they are not directly facing each other (as shown in FIG. 13).

The system of the present embodiment detects the position of each user based on the positions of the beacons 10 and determines a face-to-face state of two users when the two users are adjacent to each other.

The present invention is not limited to the above-described embodiment, and can be modified or combined within a scope that does not deviate from the spirit of the present invention.

<Computer-Readable Recording Medium>

A program that causes a computer or other machine or device (hereinafter, computer or the like) to perform any of the above functions may be recorded on a recording medium that can be read by the computer or the like. The function can be achieved by causing the computer or the like to read and execute the program of this recording medium.

Here, the recording medium that can be read by the computer or the like is a recording medium that can store information such as data and programs by electrical, magnetic, optical, mechanical, or chemical action and can be read by the computer or the like. In such a recording medium, elements constituting a computer such as a CPU and a memory may be provided, and the CPU may execute the program.

Examples of the recording medium that is removal from the computer or the like include a flexible disk, magneto-optical disk, CD-ROM, CD-R/W, DVD, DAT, 8 mm tape, and memory card.

Examples of the recording medium that is fixed to the computer or the like include a hard disk and ROM.

REFERENCE SIGNS LIST

10 Beacon
11 Communication unit
12 Storage unit
20 Controller
21 Beacon communication unit
22 Communication unit
23 Storage unit
30 Mobile beacon
41 Communication unit
42 Storage unit
43 Server
50 Communication unit
90 Calculation unit
43 Storage unit
50 User
90 Information processing device
91 Processor
92 Memory
93 Storage unit
94 Input unit
95 Output unit
96 Communication control unit
100 Network
T100 Adjacent beacon information table
T200 Face-to-face state table

What is claimed is:

1. A face-to-face state determination system comprising: a plurality of beacons configured to be installed in a predetermined space; a plurality of mobile beacons configured to be carried by users; and a controller configured to control the beacons and the mobile beacons, wherein the beacons and the mobile beacons each perform mesh communication with another beacon or another mobile beacon, a first mobile beacon that is one of the mobile beacons and carried by a first user transmits a first signal including information for identifying the first mobile beacon, a second mobile beacon that is one of the mobile beacons and carried by a second user transmits, upon receiving the first signal from the first mobile beacon, to the controller a second signal including the information for identifying the first mobile beacon, a reception intensity of the first signal, and information for identifying the second mobile beacon, and the controller receives the second signal and performs, based on the reception intensity of the first signal included in the second signal, face-to-face state determination in which the controller determines, when the reception intensity of the first signal is greater than or equal to a first threshold value for a predetermined time period or longer, that the first user and the second user are facing with each other, and determines, when the reception intensity of the first signal is less than the first threshold value and greater than or equal to a second threshold value, which is less than the first threshold value, for the predetermined time period or longer, that the first user and the second user are facing one direction.

2. The face-to-face state determination system according to claim 1, wherein
the second mobile beacon carried by the second user transmits a third signal including the information for identifying the second mobile beacon,
a first beacon that is one of the beacons configured to be installed in the predetermined space transmits, upon receiving the first signal from the first mobile beacon carried by the first user, to the controller a fourth signal including the information for identifying the first mobile beacon and information for identifying the first beacon,
a second beacon that is one of the beacons configured to be installed in the predetermined space transmits, upon receiving the third signal from the second mobile beacon carried by the second user, to the controller a fifth signal including the information for identifying the second mobile beacon and information for identifying the second beacon, and
the controller receives the fourth signal and the fifth signal and, based on the information for identifying the first beacon included in the fourth signal and the information for identifying the second beacon included in the fifth signal, performs the face-to-face state determination when the first beacon and the second beacon are a same beacon or beacons that are set adjacent to each other.

* * * * *